United States Patent [19]
Bassi et al.

[11] Patent Number: 5,965,708
[45] Date of Patent: *Oct. 12, 1999

[54] MODIFIED WHEAT GLUTENS AND USE THEREOF IN FABRICATION OF FILMS

[75] Inventors: Sukh Bassi, Atchison, Kans.; Clodualdo C. Maningat, Platte City, Mo.; Rangaswamy Chinnaswamy, Kansas City, Mo.; Li Nie, Kansas City, Mo.; Michael K. Weibel, West Redding; John J. Watson, Easton, both of Conn.

[73] Assignee: Midwest Grain Products, Inc., Atchison, Kans.

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,219

[22] Filed: Mar. 11, 1997

Related U.S. Application Data

[63] Continuation-in-part of application No. 08/614,373, Mar. 12, 1996, Pat. No. 5,747,648.

[51] Int. Cl.$^6$ .......... A61K 35/78; C07K 14/415; A23J 1/00; C04B 7/00
[52] U.S. Cl. .......... 530/374; 514/12; 514/120; 426/656; 423/519; 106/649
[58] Field of Search ............ 514/120, 12; 530/374; 426/656; 423/519; 106/649

[56] References Cited

U.S. PATENT DOCUMENTS

| | | |
|---|---|---|
| 2,309,113 | 1/1943 | Huppert . |
| 3,615,715 | 10/1971 | Mullen . |
| 3,653,925 | 4/1972 | Anker et al. . |
| 4,238,515 | 12/1980 | Shemer ................ 426/104 |
| 4,911,942 | 3/1990 | Yajima . |
| 4,935,257 | 6/1990 | Yajima . |
| 4,990,349 | 2/1991 | Chawan et al. . |
| 5,330,778 | 7/1994 | Stark et al. . |
| 5,472,511 | 12/1995 | Rayas et al. . |
| 5,610,277 | 3/1997 | Bassi et al. . |

FOREIGN PATENT DOCUMENTS

| | | |
|---|---|---|
| 2406471 | 7/1971 | Japan . |
| 9414886 | 7/1994 | WIPO . |

OTHER PUBLICATIONS

Gennadios et al.; Modification of Physical and Barrier Properties of Edible Wheat Gluten–Based Films; Cereal Chem. 70(4): 426–429.
Meester; Extraction et utilisation de la gliadine et de la glutenine du froment; Jan. 1974; Industries Alimentaires et Agricoles 91 Annee.
Goforth et al.; Separation of Glutenin from Gliadin by Ultracentrifugation; Cereal Chem.; 53 (4) 608–612.
Gennadios et al.; Moisture Absorption by Grain Protein Films; Transactions of the ASAE; vol. 37(2):535–539.
Chem. Ab No. 121:257510z; Kawaguchi et al.; Gluten sheets and manufacture thereof and cleaning tools using the same for dust pickup on contact.
Chem Ab No. 121:156095n; Gennadios et al.; Water vapor permeability of wheat gluten and soy protein isolate films.
Chem Ab. No. 120:219267x; Yashi et al.; Development of biodegradable gluten plastics.
Chem Ab No. 119:182230f; Makoto; Biodegradable plastics derived from poly(amino acids).
Chem Ab No. 119:74215w; Domae et al.; Gluten moldings and their manufacture.
Chem Ab. No. 117:9072s; Domae et al.; Biodegradable plastics containing gluten.
Chem Ab. No. 116:256890h; Yamashita; Development trends on biodegradable plastics.
Sato, Proteins of the soy bean and their industrial application; J. Chem. Ind. Tokyo 23, 1–25 (1920).
Sato; Proteins of the soy bean and their industrial application; J. Chem. Ind. (Japan) 23, 425–39 (1920).
Davies et al.; Plasticisation and Mechanical Properties of Heat–Set Wheat Gluten; International Workshop on Gluten Proteins (1990;.
Chem Ab No. 121:281872q; Hasegawa et al.; Biodegradable thermoplastic composition from corn gluten meal and its preparation.
Gennadios et al.; Edible Films and Coatings from Soymilk and Soy Protein; Cereal Foods World; Dec. 1991; vol. 36, No. 12.
Yasui et al.; Development of biodegradable gluten plastics; Kobunshi Kako 1991, 40(8), 407–11.
Tolstoguzov; Thermoplastic Extrusion—The Mechanism of the Formation of Extrudate Structure and Properties; JAOCS, vol. 70, No. 4 (Apr. 1993).
Prudencio–Ferreira et al.; Protein–Protein Interactions in the Extrusion of Soya at Various TEmperatures and Moisture Contents; J. Food Science, vol. 58, No. 1993; 378–381.
Paetau et al.; Biodegradable Plastic Made from Soybean Products. 1. Effect of Preparation and Processing on Mechanical Properties and Water Absorption; Ind. Eng. Chem. Res. 1994, 33, 1821–1827.
De Deken et al.; Wheat gluten. II. Action of reducing agents; Biochim. et Biophys. Acta 16, 566–9(1955).

(List continued on next page.)

*Primary Examiner*—Jeffrey Stucker
*Assistant Examiner*—Phuong T. Bui
*Attorney, Agent, or Firm*—Hovey, Williams, Timmons & Collins

[57] ABSTRACT

Gluten protein-based biodegradable or edible films are produced using aqueous, essentially alcohol-free casting dispersions containing modified protein (preferably wheat gluten protein) and a plasticizer. The modified protein is prepared by treating purified naturally occurring wheat protein with a reducing agent (e.g., sodium metabisulfite) in order to reduce the average molecular weight of the wheat protein and to cleave disulfide bonds therein. Such modified wheat gluten protein lowers the viscosity and allows increased solid contents in the casting dispersions, allowing fabrication of improved films using continuous casting techniques and without use of organic solvents.

11 Claims, 1 Drawing Sheet

OTHER PUBLICATIONS

Matsumoto; Breadmaking. XII. The mechanism of NaHSO$_3$ effect on gluten; J. Fermentation Technol. 33, 235–7 (1955).

Wada et al.; Studies on the production of artificial plastic masses from soybean protein; J. Soc. Chem. Ind., Japan 42, Suppl. binding 317–18 (1939).

Chem Ab No. 122:316010g; Kubota et al.; Biodegradable plastics obtained from water–in–soluble corn proteins.

Chem Ab. No. 122: 263837y; Gontard; Edible wheat gluten films: optimization of the main process variables and improvement of water vapor barrier properties by combining gluten proteins with lipids.

Chem Ab. No. 122:135036z; Nishiyama et al.; Investigation on research for degradable plastics.

Chem Abs Nos. 122:29919e–29926e; 17–Food, Feed Chem.; vol. 122, 1995.

Chem Ab No. 119:265990e; Ando; Biodegradable protein products for use as packaging mateiral or container.

Chem Ab. No. 119:119103b; Nagai et al.; Biodecomposable thermoplastic moldings and their manufacture.

Chem Ab. No. 19008d; Anker et al.; Shaped articles by extruding nonthermally coagulable simple proteins.

Cherian et al.; Thermomechanical Behavior of Wheat Gluten Films: Effect of Sucrose, Glycerin and Sorbitol; 2 Cereal Chem.; vol. 72, No. 1, 1995.

Park et al.; Water Vapor Permeability and Mechanical Properties of Grain Protein–Based Films as Affected by Mixtures of Polyethylene Glycol and Glycerin Plasticizers; Transactions of the ASAE; vol. 37(4): 1281–1285 (1994).

Rayas et al.; Development and Characterization of Biodegradable/Edible Wheat Protein Films; J. Food Science, vol. 62, No. 1 (1997).

Krull et al.; Industrial Uses of Gluten; Cereal Science Today; vol. 16, No. 8 (1971).

Gontard et al., J. of Food Science, vol. 58, No. 1, 1993, pp. 206–211.

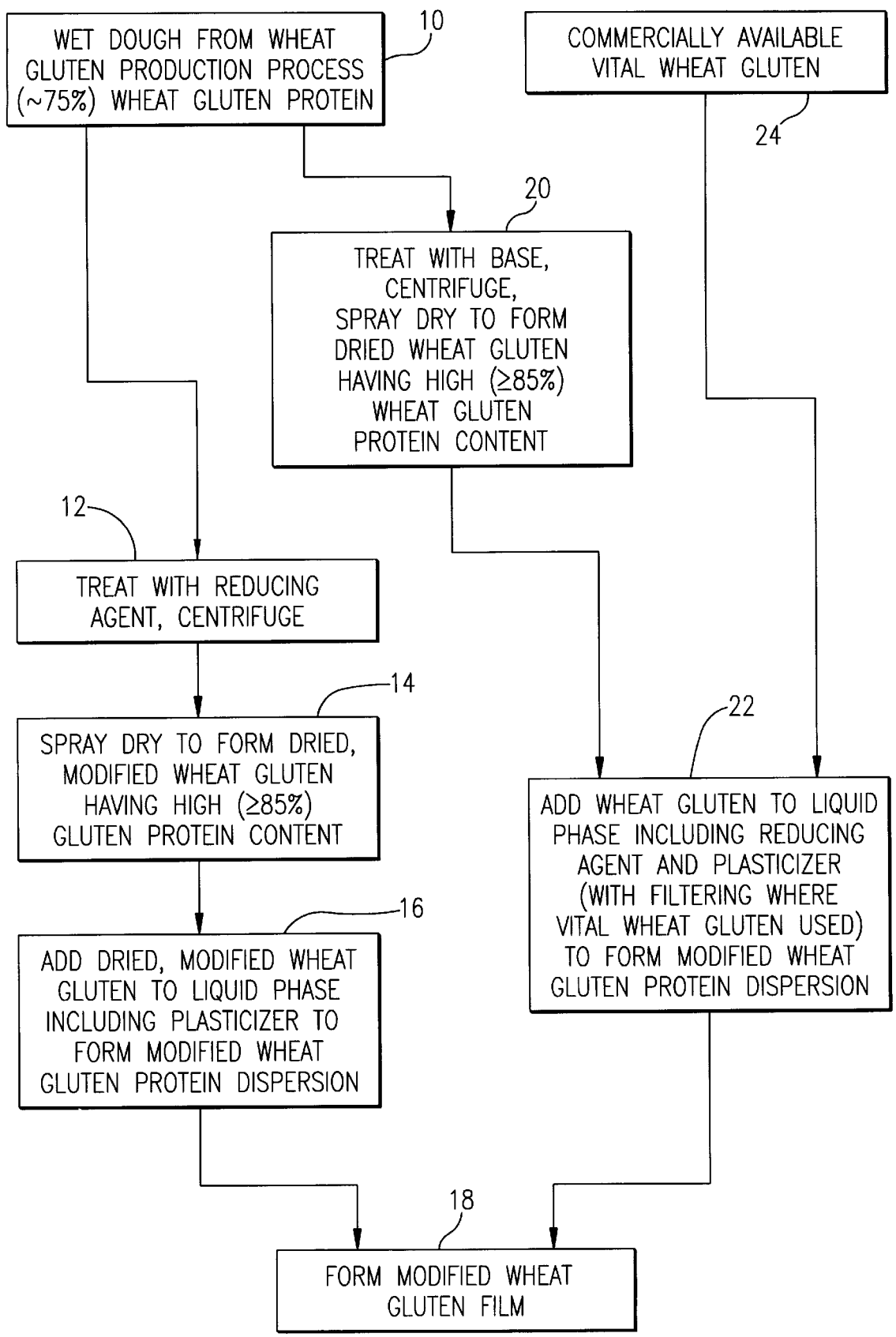

MODIFIED WHEAT GLUTENS AND USE THEREOF IN FABRICATION OF FILMS

CROSS-REFERENCE TO RELATED APPLICATION

This is a continuation-in-part of application Ser. No. 08/614,373 filed Mar. 12, 1996, now U.S. Pat. No. 5,747,648.

BACKGROUND OF THE INVENTION

1. Field of the Invention

The present invention is broadly concerned with modified glutens and dispersions which can be used in the casting of biodegradable and/or edible gluten-based films. More particularly, the invention pertains to such glutens, gluten products, dispersions and films, and methods of fabricating the same, wherein wheat gluten is modified with a reducing agent for cleaving of disulfide bonds therein under controlled conditions which improve the rheological properties of the grain protein. Such modified wheat glutens can be used to fabricate superior films having good strength and thermal sealing properties. The dispersions of the invention can be continually cast into films using commercial film-forming equipment and without use of organic solvents.

2. Description of the Prior Art

Grain proteins, such as those derived from soy protein, or wheat or corn gluten, are commercially available and are relatively inexpensive in comparison to other biomaterials and many synthetic polymers. It has been suggested that such grain proteins and particularly the modified wheat glutens can be used to form flexible films by solution or dispersion casting, provided that the wheat glutens are used with appropriate plasticizers. Generally, it is understood that such films are insoluble in water and have good moisture permeability, but are deficient in oxygen permeability and tear strength.

In many film-forming prior procedures, the gluten-based casting solutions are prepared with alcohol and are heated to levels which substantially denature the gluten proteins and gelatinize the starch content of the solution. See, e.g., U.S. Pat. No. 3,653,925. The use of alcohol solvents renders commercial-scale processing difficult and dangerous owing to explosion hazards. Heat denaturation of the gluten proteins lowers the ultimate strength of the films and the gelatinized starch further weakens the films and creates non-transparent films.

There is accordingly a real and unsatisfied need in the art for improved techniques and products for the fabrication of wheat gluten-based biodegradable and/or edible films which yields films having better physical properties while avoiding use of large quantities of alcohol as a part of film casting solutions or dispersions.

SUMMARY OF THE INVENTION

The present invention overcomes the problems outlined above, and provides enhanced modified gluten, gluten products and dispersions, and gluten-based films having superior physical properties. Generally speaking, the improved products of the invention are based upon use of highly concentrated, substantially undenatured modified wheat gluten. Broadly, a starting gluten material is treated with a reducing agent in order to lower the average molecular weight of the gluten proteins, and also to cleave in a controlled way a proportion of the disulfide bonds of the proteins. Such a modified wheat gluten product can be prepared and dried for later use. In such cases, the dried product is added to an aqueous liquid phase which is essentially alcohol-free (preferably no more than about 2% by weight alcohol and more preferably completely alcohol-free) including a plasticizer to form a modified gluten film casting dispersion. Alternately a casting dispersion can be made directly from starting gluten by treatment with a reducing agent and addition of a plasticizer.

In film-forming procedures, the modified wheat gluten dispersions of the invention are layered onto a substrate and dried. Preferably, the film drying is done as a high temperature-short time operation. Final dried films in accordance with the invention have excellent tear strength and thermal sealing properties.

BRIEF DESCRIPTION OF THE DRAWING

The single drawing is a schematic flow diagram illustrating the preferred processing steps for obtaining modified wheat gluten products and dispersions, and wheat gluten-based films.

DETAILED DESCRIPTION OF THE PREFERRED EMBODIMENTS

Turning to the drawing, preferred processes in accordance with the invention are schematically set forth with particular reference to the use of wheat gluten as the starting material to produce modified wheat glutens, modified wheat gluten products and dispersions, and resulting wheat gluten films.

Referring to the drawing, a preferred process of the invention begins with provision of wheat gluten starting material 10. In the illustrated process, conventional wet dough from a wheat gluten production process may be used, having about 75% by weight wheat gluten on a dry basis. In order to provide the most suitable starting material for the formation of film-forming dispersions, the gluten dough in step 10 should be concentrated to achieve a gluten protein content of at least about 85% by weight, and more preferably from about 85–95% by weight (dry basis). Advantageously, the concentrated wheat gluten material should have a maximum of about 10% by weight of naturally occurring brans, starches and other insolubles, and more preferably from about 0.1–8% by weight thereof. Generally, in order to obtain such high protein content, low insolubles wheat gluten, it is necessary to remove naturally occurring brans, starches and other insolubles from the commercially available wet dough.

In one aspect of the invention, the gluten starting material 10 is treated to form a modified gluten protein product which is dried and then used to form a casting dispersion. This exemplary process is illustrated in the drawing in steps 12–16, inclusive. In particular, in the first step 12 of this process, the high gluten protein starting material is treated with a reducing agent and centrifuged to form a modified gluten protein product. The function of the reducing agent is to cleave disulfide bonds in the gluten protein, and to lower the average molecular weight thereof. Preferably, the modified gluten protein product has an average molecular weight of up to about 3000 kDa, and more preferably up to about 1000, and most preferably from about 50–900 kDa; moreover, the product should have at least about a 5% reduction in disulfide bonds as compared with the naturally occurring gluten protein in the gluten starting material, and more preferably from about a 25–100% reduction in disulfide bonds.

The reducing agents useful in the context of the invention are preferably taken from the group consisting of the alkali metal and ammonium sulfites, bisulfites, metabisulfites and nitrites, and mercaptoethanol, cysteine, cysteamine, and ascorbic acid; the alkali metal metabisulfites are most preferred. The amount of reducing agent used should be at a level of from about 0.05–20% by weight, based upon the weight of the wheat gluten protein in the wheat gluten starting material taken as 100% by weight. A more preferred range in this respect is from about 0.05–1% by weight on the same basis. In practice, the treatment of step 12 involves contacting the gluten starting material with an aqueous solution of reducing agent at ambient room temperature. The centrifugation step is conventional and is carried out in order to remove insoluble brans, starches and other insolubles and thereby increase the protein content of the starting dough.

Step 14 as illustrated in the drawing involves conventional spray drying the modified gluten protein product in order to yield a powder. Normally, this powder would have a maximum moisture content of about 10% by weight, more preferably up to about 7% by weight. The powder itself has an extended shelf life, and can be sold as a product of commerce to customers wishing to fabricate gluten-based films.

Referring to step 16, the dried modified gluten protein product is added to an aqueous, essentially alcohol-free liquid phase which includes a plasticizer in order to form a modified protein dispersion. Such a dispersion would typically include from about 15–25% by weight gluten protein. In addition, the liquid phase would normally include a member selected from the group consisting of acids and bases for altering the pH of the liquid phase in order to promote the dispersion of the modified gluten protein therein. Optional ingredients can also be used in the liquid phase, for example, a release agent, colorant and defoamer.

In preferred forms, the plasticizer is a polyol, a modified polyol or polymeric alcohol or polyol or urea. The plasticizer is advantageously selected from the group consisting of glycerol, diglycerol, propylene glycol, triethylene glycol, sorbitol, mannitol, maltitol, hydrogenated starch syrup, polyvinyl alcohol, polyethylene glycol, urea and mixtures thereof, glycerol is the most preferred plasticizer. In terms of levels of use, the plasticizer is employed in an amount sufficient to lower the glass transition temperature of the final film below about 25° C. Thus, the plasticizer is preferably present at a level of from about 15–40% w/w, and more preferably from about 25–30% w/w, based upon the weight of modified gluten protein taken as 100% by weight. The water content of the modified gluten protein dispersions would be up to about 85% by weight and more preferably from about 75–80% by weight.

The pH adjusting agent is most preferably a base, with sodium hydroxide, potassium hydroxide and ammonia being most preferred. Generally, sufficient base should be added to adjust the pH of the modified gluten protein dispersions to a level of about 8–12, and most preferably from about 8.5–11.5. Such pH levels are usually achieved by using from about 1–15% w/w base, with the weight of the modified gluten protein taken as 100% by weight, and more preferably from about 1.5–10% by weight on this basis.

Release agents are very commonly used and are selected from the group consisting of the alkali salts of long chain fatty acids ($C_8$–$C_{22}$) as well as glycerol sorbitol monostearates; particularly the potassium and sodium salts of palmitic and stearic acids and combinations thereof. Release agents are normally used at a level of from about 0.05–2% w/w (more preferably from about 0.3–0.8% w/w) based upon the protein content of the dispersion taken as 100% by weight.

Release agents facilitate separation of final films from a casting substrate.

Defoamers if used are added to aid in the process of degassing of the modified gluten protein dispersion before casting thereof. Many commercially available defoamers can be used in minor amounts for this purpose, typically up to about 5% by weight, based upon the weight of the modified gluten protein taken as 100% by weight. Obviously, if edible films are desired, food grade defoamers would be used.

Colorants can be added to the modified gluten protein dispersion in order to give a desired color to the final films. The amount of colorant used is typically less than 1% by weight, based upon the weight of the modified gluten protein taken as 100% by weight.

In preparative procedures, it is important that the modified gluten protein dispersions be prepared without excessive heat in order to insure that the modified gluten protein content of the dispersions is not substantially heat denatured. To this end, the dispersions of the invention are preferably made with agitation but at a temperature below about 40° C., and most preferably below about 32° C. In this way, one can be assured that the modified gluten protein content of the dispersion is not rendered insoluble or otherwise unacceptably denatured.

As indicated, it is normally desirable to degas the modified gluten protein dispersions prior to casting. This is usually done under vacuum conditions so as to render the dispersions essentially free of entrained air bubbles.

The final modified gluten protein dispersions useful for direct film casting would normally have a viscosity of from about 5000–25,000 cps (Brookfield at 10 rpm), and more preferably from about 7000–12,000 cps. Moreover, they would be maintained at relatively low temperatures, and preferably no more than about 40° C., and preferably up to about 32° C. In casting procedures as referred to in step 18, the prepared dispersions are layered by known means onto a substrate such as a stainless steel plate or belt to achieve a substantially uniform thickness (a wet thickness of from about 2–50 mils, more preferably from about 6–12 mils). The layers are then dried at a controlled temperature and humidity to give the final films. Preferably, the drying procedure should be carried out at relatively high temperatures and short drying times. For example, the drying temperature (i.e., of the belt environment) is preferably from about 60–99° C. (more preferably from about 70–85° C.), with a drying time of up to about 10 min., and more preferably from about 1–5 min. The humidity conditions in the drying chamber should also be controlled, to achieve an initial relative humidity of from about 5–50%, more preferably up to about 10%.

The wet gluten dough from step 10 may alternately be treated via steps 20–22 as shown in the drawing to form a modified gluten protein dispersion. In this process, the starting wet dough is initially treated with base and centrifuged followed by spray drying to form the desired concentrated dried wheat gluten having at least about 85% by weight wheat gluten protein content. Thereafter, the dried wheat gluten may be modified by adding it to a liquid phase including reducing agent and plasticizer to directly form the modified wheat gluten protein dispersion (step 22). In this instance, the dried wheat gluten is subjected to the reducing agent in the presence of the plasticizer so that the gluten is treated to reduce the average molecular weight thereof and to cleave disulfide bonds at the time the casting dispersion is formed. This dispersion can then be used to form the wheat gluten film in step 18 as indicated in the drawing.

Another alternate procedure depicted in the drawing involves direct formation of a modified gluten protein dispersion from commercially available vital wheat gluten (step 24). In such an alternative technique, the vital wheat gluten starting material is directly added to a liquid phase including at least a reducing agent and a plasticizer to directly form a modified gluten protein dispersion. Also, a filtering step is employed to reduce the content of the bran, starch and other insolubles and thereby elevate the wheat gluten protein content of the dispersion. In this case, the amounts and preparative procedures described previously in connection with the first method of preparation are followed. Similarly, once a modified gluten protein dispersion is formed in step 22, the casting thereof in step 18 is carried out exactly as described.

Final gluten films in accordance with the invention have very desirable strength and thermal sealing abilities. Moreover, the films hereof can be readily controlled in terms of color and opacity. As indicated above, the modified gluten protein content of the casting dispersions are subjected to disulfide bond cleavage owing to the treatment with reducing agent. It is to be understood however, that the film drying process serves to reform many of these disulfide bonds to increase the tear strength of the final films. In this connection, the gluten-based films of the invention comprise a matrix of modified gluten protein and a plasticizer. It is believed that the modified gluten protein present in the final films is somewhat different than that present in the casting dispersions. As indicated previously, the plasticizer is present in the final film in an amount to lower the glass transition temperature thereof to below about 25°C. This translates to a plasticizer content of the films of from about 15–40% by weight, and more preferably from about 25–30% by weight. The final moisture content of the films of the invention would be up to about 15% by weight, and more preferably from about 5–10% by weight.

The other ingredients would include the release agent and colorant. The release agent would normally be present at a level of up to about 2% by weight, based upon the weight of the modified gluten protein content of the films taken as 100% by weight. The colorant will of course be present at a level necessary to give a desired color.

Although the films can be of variable thickness, normally they have a thickness of up to about 50 mils and more preferably from about 2.5–20 mils. The films of the invention would generally have tensile strengths of from about 50–300 kg/cm$^2$ and more preferably from about 75–250 kg/cm$^2$. Tear moduli would range from about 1.0–60, more preferably from about 2–50. Elongation values may vary from about 50–300%, more preferably from about 60–200%.

The following examples set forth presently preferred techniques for the preparation of modified wheat gluten protein products, modified gluten protein dispersions, and resultant gluten-based films. It should be understood in this respect that the examples are provided by way of illustration only, and nothing therein should be taken as a limitation upon the overall scope of the invention.

EXAMPLE 1

Seventy-five parts by weight of wheat gluten isolate (Midwest Grain Products, Inc.) was blended with 25 parts by weight food grade glycerol (99%, Sigma Chemical Co.) using a Hobart mixer. The mixed sample was gradually transferred to a homogenizing tank containing 347 parts by weight water, 0.15 parts by weight sodium metabisulfite, 1.5 parts by weight sodium hydroxide, 0.45 parts by weight potassium stearate and 0.9 parts by weight Mazu DF203 defoamer (PPG Industries, Inc.). Creation of the modified gluten protein dispersion took about 10 minutes and the final dispersion temperature was 25°C. Thereafter, the modified gluten protein dispersion was degassed under vacuum to give a viscous dispersion essentially free of air bubbles.

The complete modified gluten protein dispersion was then applied onto a stainless steel plate using a film applicator to give a film thickness of about 3 mils. The applied film was then dried for about 3 minutes in a closed oven at a constant temperature of 90°C. The dried film was then readily peeled from the plate.

EXAMPLE 2

The process of Example 1 was repeated, except vital wheat gluten (approximately 75% by weight wheat gluten protein) is used instead of wheat gluten isolate. Prior to degassing, the modified gluten protein dispersion was pressure filtered to remove bran, starch and other soluble materials.

EXAMPLE 3

A dried modified high protein wheat gluten product was prepared by purification of wet gluten dough from a commercial gluten production process (Midwest Grain Products, Inc.). Wet gluten dough containing 100 parts by weight gluten solids was dispersed in a 1% ammonia solution to give a solids content of 14% by weight. 0.5 parts by weight sodium metabisulfite was then added to the ammonia-gluten dispersion. After 5 minutes set time, the ammonia-gluten dispersion was centrifuged to remove most of the insolubles. The purified modified gluten protein product was then spray dried to give a dried modified gluten protein product having a protein content of about 90% by weight, dry basis.

The dried modified gluten protein product was then dispersed in a liquid phase for film production. In particular, 75 parts by weight of the dried modified gluten protein product were mixed with 25 parts by weight food grade glycerol in a Hobart mixer. The mixed sample was transferred to a homogenizing tank containing 347 parts by weight water, 1.5 parts by weight sodium hydroxide, 0.6 parts by weight stearic acid and 0.9 parts by weight Mazu DF203 defoamer to create a modified gluten protein dispersion. The dispersion took about 10 minutes to form. The dispersion temperature was maintained throughout at about 25°C. After formation of the modified gluten protein dispersion, it was degassed under vacuum to give a viscous dispersion essentially free of air bubbles. The modified gluten protein dispersion was then applied to a stainless steel plate with a film applicator to give a layer which resulted in a final film thickness of 3 mils. The layer was dried in a closed oven with a control temperature of 90°C. over a period of about 3 minutes. The dried film was readily peeled from the plate.

EXAMPLE 4

The process of Example 1 was repeated except that the modified gluten protein dispersion was formulated using 7.5 parts by weight ammonia in lieu of sodium hydroxide.

EXAMPLE 5

In this example, a wheat gluten isolate having a protein content (N x 6.25) of 92.5% by weight and a moisture content of 5.0% by weight was used to prepare a master batch casting solution of the type referred to in step 22 of the Figure. A total of 27 pounds of the wheat gluten isolate were carefully dispersed into 59 pounds of an alkaline (potassium hydroxide, Fisher Scientific Co.) cold water solution (16° C.) containing an antifoam agent (BASF L-121) and sodium metabisulfite (Fisher Scientific Co.) reducing agent by slow serial addition of five pound aliquots of the gluten isolate to the alkaline solution. Mixing and dispersion of the gluten isolate was carried out in a 50 gallon liquifier (Breddo Corporation). After initial fluidization of the gluten isolate was achieved, 15 pounds of ice was added to the mixture and high intensity mixing was continued to completely hydrate and disperse all gluten particles and agglomerants as evidenced by the absence of any visible. physical heterogeneity in a draw-down film. The high intensity mixing was completed after 15 minutes at which time the temperature of the mixture was 29° C. An 8 gallon aliquot of the master batch mixture was withdrawn and immediately vacuum degassed for 15 minutes at a vacuum pressure of −28 inches Hg using a stirred 25 gallon reactor.

The final batch mixture totaled 101 pounds, containing 27 pounds of the gluten isolate, 0.5 pounds (1.85% w/w based on the protein content taken as 100%) antifoam agent, 0.65 pounds (2.5% w/w based on the protein content taken as 100%) potassium hydroxide, 56.75 g (0.46% w/w based on the protein content taken as 100%) reducing agent, with the balance being water. The pH of the final mixture was 11.2. Rotational viscometry measurements using a Brookfield RTV viscometer at 10 rpm gave viscosities of 8000, 9600 and 15,200 cps at mixture temperatures of 27° C., 21° C. and 17° C. respectively.

The theoretical concentration of the master batch mixture was 24.7% by weight protein solids with other non-volatile solids estimated at 0.7% by weight for an approximate total solids content of 25.4% by weight. The experimentally determined non-volatile solids content (16 hours at 105° C.) was 25.6% by weight, a good agreement with the theoretical value considering some evaporative losses during vacuum degassing.

It was found that the master batch mixture did not undergo significant changes in physical characteristics over several weeks storage, if it was immediately stored under refrigerated conditions at about 4° C. with care taken to maintain substantially anaerobic conditions.

A series of tests mixtures containing the master batch mixture as well as plasticizer (either glycerine or propylene glycol (PG)) and release agent (5% aqueous solution of potassium stearate) were prepared using 500 g aliquots of the master batch mixture (estimated to contain 128 g of protein) according to the following recipes. In each case, the mixtures were prepared by adding the appropriate amount of plasticizer and release agent to the 500 g aliquot in a 1 liter beaker and carefully mixing the contents on a Cafamaro mixer at low speed using a paddle blade stirrer assembly to avoid incorporation of excess air. All percent w/w values are based upon the protein content of the preparations taken as 100% by weight.

TABLE 1

| Experiment # | Glycerine | Propylene Glycol | Potassium Stearate |
|---|---|---|---|
| 1 | 25.0 g (20% w/w) | | 12.5 g (0.5% w/w) |
| 2 | 31.3 g (25% w/w) | | 12.5 g (0.5% w/w) |
| 3 | 37.5 g (30% w/w) | | 12.5 g (0.5% w/w) |

TABLE 1-continued

| Experiment # | Glycerine | Propylene Glycol | Potassium Stearate |
|---|---|---|---|
| 4 | | 25.0 g (20% w/w) | 12.5 g (0.5% w/w) |
| 5 | | 31.3 g (25% w/w) | 12.5 g (0.5% w/w) |
| 6 | | 37.5 g (30% w/w) | 12.5 g (0.5% w/w) |

The test mixtures described above were formed into films using a continuous casting assembly. The latter consisted of a stainless steel belt casting surface moving over segmented, serial steam chests heating the belt from below and a high velocity, countercurrent heated air tunnel above the belt surface with initial relative humidity of less than 10%. The belt was 24 inches wide whereas the air tunnel drying chamber had a length of 60 feet. Three of five existing steam chests were employed in these tests, giving a belt temperature in the presence of the countercurrent air flow above the belt estimated to be 80–85 ° C. A simple gravity-fed casting box with a vertically adjustable casting bar was positioned above the belt adjacent to one end thereof to feed the test mixtures (at ambient temperature of about 21 ° C.) onto the moving belt casting surface. Adjustment of the casting bar allowed regulation of the wet film thickness (typically 9–10 mils). The belt speed (and hence the residence time in the drying chamber) was variable and typically was maintained at about 17–20 ft/min. for an average residence time in the chamber of 3–4 min.

All films were cast with a width of 6–8 inches and displayed good belt adhesion in the drying tunnel with excellent release characteristics to the downstream rewind collection spool. All test films were heat sealable with good physical handling characteristics.

The test films were examined for standard physical properties. Tensile strengths were measured on a Single Strand Strength Tester Model 3A (Alfred Suter Co.) and were expressed as applied force/cross-sectional area (kg/cm$^2$). The relative tear moduli were measured with an Elmendorf Tearing Tester (Albert Instrument Co.). These test results are tabulated in Table 2 and are the average of the three test swatches of each film.

TABLE 2

| Test Film # | Thickness (mil) | Tensile Strength (kg/cm$^2$) | Tear Modulus |
|---|---|---|---|
| 1 (20% glycerine) | 3.02 | 180 | 5.3 |
| 2 (25% glycerine) | 2.97 | 117 | 24.7 |
| 3 (30% glycerine) | 4.69 | 78 | 40.6 |
| 4 (20% PG) | 3.14 | 203 | 2.0 |
| 5 (25% PG) | 3.46 | 215 | 4.7 |
| 6 (30% PG) | 3.08 | 133 | 9.3 |

These test results confirmed that continuous cast films having good mechanical properties can be prepared from aqueous gluten protein mixtures without use of alcohol or other solvents. Both glycerine and PG are good plasticizers for gluten isolate based-films with tensile strength and tear modulus varying inversely and directly, respectively, for increasing concentration of plasticizer relative to protein content.

EXAMPLE 6

A master batch casting mixture was prepared in a manner similar to that of Example 5 except that the initial temperature of the alkaline dispersing solution was 10° C. This extended the mixing time window to 30 min. before reaching 28° C. After degassing the viscosity of the mixture was 8000 and 10,000 cps at 27° C. and 24° C., respectively. One kg aliquots of the mixture were added to binary plasticizer combinations of glycerine and urea (except for a urea-free control) with 0.5% by weight potassium stearate as a release agent for continuous casting tests, using the equipment and methods described in Example 5. The following preparations were used, where all percentage w/w data are based on protein content of the preparations taken as 100% by weight.

TABLE 3

| Experiment # | Glycerine | Urea | Potassium Stearate |
| --- | --- | --- | --- |
| 1 | 50 g (20% w/w) | | 25 g (0.5% w/w) |
| 2 | 50 g (20% w/w) | 6.3 g (5% w/w) | 25 g (0.5% w/w) |
| 3 | 50 g (20% w/w) | 12.5 g (10% w/w) | 25 g (0.5% w/w) |
| 4 | 50 g (20% w/w) | 18.8 g (15% w/w) | 25 g (0.5% w/w) |

All test films gave excellent release and physical handling properties. After storage equilibrium at around 20% humidity, films 2–4 became progressively more tacky and film 4 sufficiently fused after 1 month that it could not be unrolled. Film 1 (control) remained pliable and non-tacky after 3 months storage at ambient conditions. The physical properties of the films are summarized in Table 4 (experiment 4 film could not be tested because it was too tacky to unroll).

TABLE 4

| Test Film # | Thickness (mil) | Tensile Strength (kg/cm$^2$) | % Elongation |
| --- | --- | --- | --- |
| 1 (20% glycerine/no urea) | 2.5 | 179 | 70 |
| 2 (20% glycerine/5% urea) | 2.52 | 97 | 110 |
| 3 (20% glycerine/10% urea) | 2.19 | 109 | 177 |

The tensile strengths of these films are comparable to those of the glycerine series in Example 5. The presence of urea appeared to make the films more elastic as evidenced by the elongation results.

We claims:

1. A process for the casting of gluten protein-based films comprising the steps of:

providing a casting dispersion comprising a modified wheat gluten protein product dispersed in an aqueous alkaline liquid phase comprising water and a plasticizer and having a pH of about 8–12, said modified wheat gluten protein product made from wheat gluten starting product treated with a reducing agent to give the modified wheat gluten protein product, said modified wheat gluten protein product comprising gliadin and glutenin fractions, having an average molecular weight of up to 1000 kDa, and having substantially no heat denaturation, said dispersion having a protein content of about 15–25% by weight, a Brookfield viscosity of about 5,000–25,000 cps, and being essentially free of alcohol;

degassing said dispersion;

and applying a liquid layer of said casting dispersion onto a moving film-forming substrate, and allowing said layer to dry on said substrate to form said film, said dispersion having a temperature during said applying step of up to about 40° C.

2. The process of claim 1, said plasticizer being selected from the group consisting of glycerol, diglycerol, propylene glycol, triethylene glycol, sorbitol, mannitol, maltitol, hydrogenated starch syrup, polyvinyl alcohol, polyethylene glycol, urea and mixtures thereof.

3. The process of claim 1, said plasticizer being present at a level of about 15–40% w/w, based upon the content of gluten protein in the dispersion taken as 100% by weight.

4. The process of claim 1, said dispersion including a release agent to facilitate separation of said film from said substrate.

5. The process of claim 4, said release agent being present at a level of about 0.05–2% w/w based upon the protein content of the dispersion taken as 100% by weight.

6. The process of claim 1, said film-forming substrate comprising a continuously moving film-receiving belt.

7. The process of claim 6, said belt being located within an elongated drying chamber.

8. The process of claim 1, said dispersion being applied as a liquid layer having a wet thickness of about 2–50 mils.

9. The process of claim 1, said film having a tensile strength of about 50–300 kg/cm$^2$.

10. The process of claim 1 said film having a tear modulus of about 1.0–60.

11. The process of claim 1, said film having an elongation of about 50–300%.

* * * * *